United States Patent [19]
Shallenberger et al.

[11] 3,863,770
[45] Feb. 4, 1975

[54] METHOD AND APPARATUS FOR HANDLING AN IRRADIATED FUEL ASSEMBLY

[75] Inventors: John M. Shallenberger; Robert E. Meuschke; Walter E. Desmarchais, all of Pittsburgh, Pa.

[73] Assignee: Westinghouse Electric Corporation, Pittsburgh, Pa.

[22] Filed: Apr. 11, 1973

[21] Appl. No.: 350,243

[52] U.S. Cl. .................. 212/14, 176/30, 176/36 C, 214/18 N, 214/152, 294/86 A, 294/86.12
[51] Int. Cl. .......................... B66c 5/02, B66c 1/28
[58] Field of Search ........ 212/14, 11, 77, 125, 135, 212/13; 176/30, 36; 214/18 N; 294/86 A, 86.12; 214/152

[56] References Cited
UNITED STATES PATENTS

| | | |
|---|---|---|
| 3,095,102 | 6/1963 | Nadler .............................. 176/30 |
| 3,096,268 | 7/1963 | Lindsay et al. ....................... 176/36 |
| 3,152,830 | 10/1964 | Pounder et al. ....................... 176/30 |
| 3,421,635 | 1/1969 | Bunger............................... 294/86 A |
| 3,515,639 | 6/1970 | Pflugrad............................. 176/36 R |
| 3,733,250 | 5/1973 | Van Santen et al. ............. 294/86 A |

*Primary Examiner*—Richard A. Schacher
*Assistant Examiner*—Jeffrey V. Nase
*Attorney, Agent, or Firm*—Z. L. Dermer

[57] ABSTRACT

A method, with apparatus therefor, is disclosed for handling an irradiated fuel assembly during underwater transfer operations. In moving from one underwater storage fixture to another, the irradiated fuel assembly is supported by primary and redundant supporting means. In the unlikely event the primary supporting means fails the redundant supporting means operates to control the rate of descent of the irradiated fuel assembly to prevent damage thereto.

13 Claims, 9 Drawing Figures

3,863,770

METHOD AND APPARATUS FOR HANDLING AN IRRADIATED FUEL ASSEMBLY

BACKGROUND OF THE INVENTION

1. Field of the Invention

This invention relates to commercial nuclear power plants, and more particularly, to handling irradiated fuel assemblies in a spent fuel building of a nuclear reactor.

2. Description of the Prior Art

In today's large, commercial nuclear power plants, handling of irradiated spent fuel assemblies is performed under water within an auxiliary building. The auxiliary building is physically separated from the containment building which houses equipment such as the reactor vessel, the reactor coolant pumps, the steam generators, and other like components of the reactor's primary system. Fuel handling in the auxiliary building includes such operations as transferring irradiated fuel assemblies from an upending device of the fuel transfer system to a spent fuel rack, and from the spent fuel rack to shipping casks.

Transfer of the irradiated fuel assemblies is performed with a long handled tool which is suspended from a spent fuel bridge located above a water filled pit. In moving an irradiated fuel assembly from one of the above enumerated locations to another, the fuel assembly first must be lifted vertically the length of the fuel assembly to clear the storage fixture. Then, the assembly is transferred horizontally until it is directly over another storage location, such as the shipping cast, whereupon it is lowered into position.

While an irradiated fuel assembly is suspended from the handling tool, it is conceivable, although highly unlikely, that the handling tool may fail. In the prior art, such a failure would result in the fuel assembly falling at a high rate of speed and impact upon the structure directly below it. Upon impact, the fuel cladding might rupture, with the subsequent release of dangerous radioactive fission gases to the auxiliary building. Furthermore, since the auxiliary building is not a containment structure, the fission gases may be released to the atmosphere.

In the prior art then, a potentially dangerous accident could conceivably occur during handling of irradiated fuel assemblies. The possibility of such an occurrence comprises a serious deficiency.

SUMMARY OF THE INVENTION

The aforementioned problem of the prior art is overcome by providing a method and apparatus therefor whereby an irradiated fuel assembly is redundantly supported throughout underwater transfer operations. The invention provides a redundant support having the capability of being continuously operable during lifting or lowering of the irradiated fuel assembly. The invention further provides a redundant support which in the unlikely event of failure of the primary support, operates to control the rate of descent of the irradiated fuel assembly.

In an exemplary embodiment of the invention, the fuel assembly is primarily supported as in the prior art by a long handled tool which is suspended from a bridge-like structure. The redundant support comprises a latch mechanism which automatically engages an irradiated fuel assembly when grasped by the fuel handling tool. The latch mechanism is supported by a long pipe which is attached to the bridge-like structure independent of the attachment of the fuel handling tool. A cable-cylinder arrangement comprising a dashpot is attached to the latch mechanism to allow for vertical motion of the latch mechanism simultaneously with the vertical motion of the long handled tool.

BRIEF DESCRIPTION OF THE DRAWINGS

Other advantages of the invention will be apparent from the following detailed description, taken in consideration with the accompanying drawings, in which.

DESCRIPTION OF THE PREFERRED EMBODIMENTS

Figure 1:
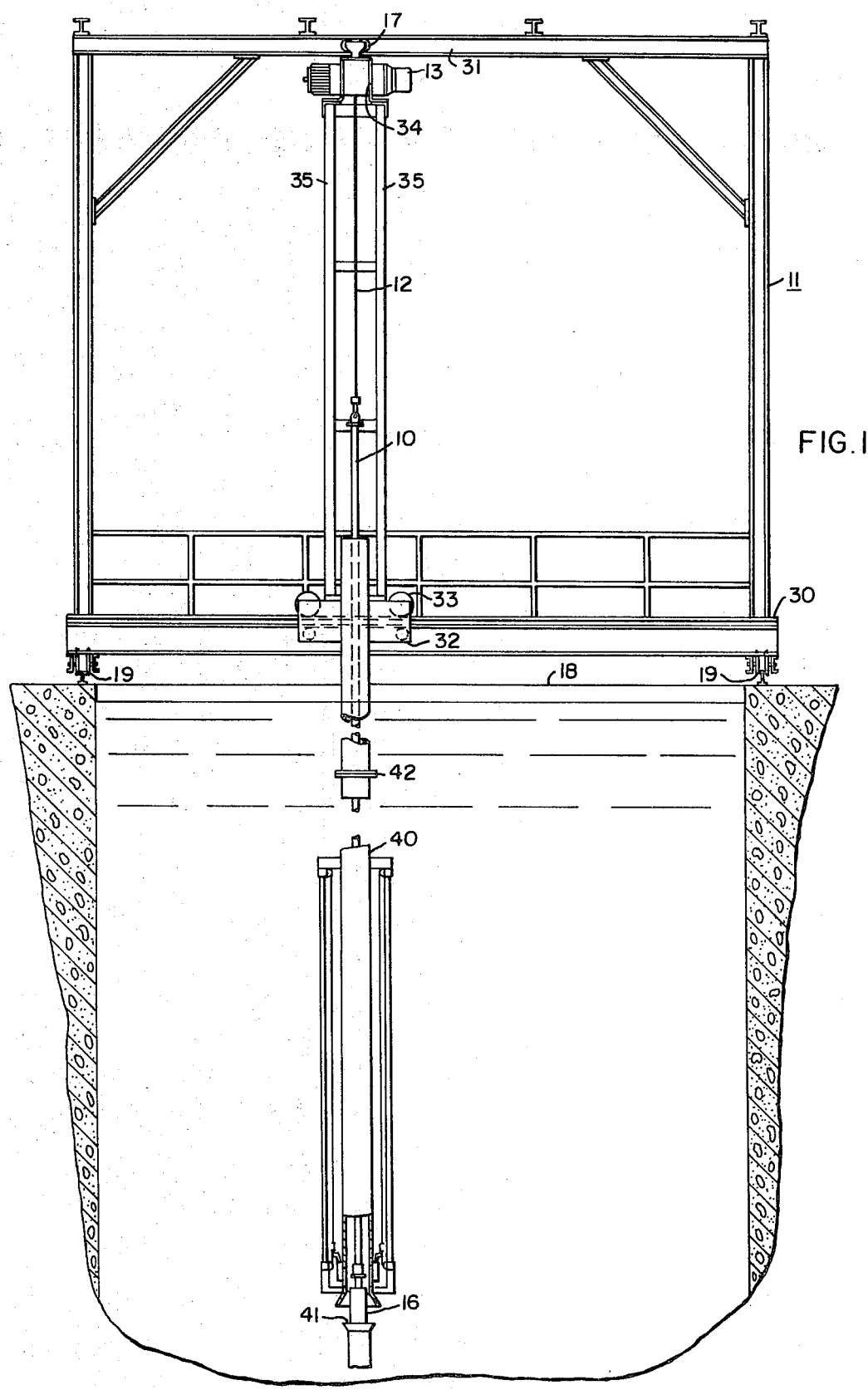
FIG. 1 is a frontal elevational view of a fuel handling tool as provided by this invention and including the spent fuel bridge from which the tool is suspended.

Throughout the description which follows, like reference characters indicate like elements in the various figures of the drawings.

Figure 3:
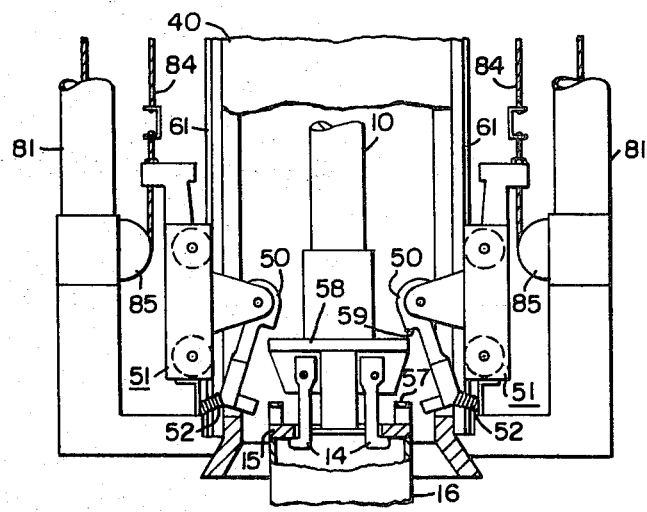
FIG. 3 is an enlarged section of the lower portion of the fuel handling tool of FIG. 1 showing the details of engaging a fuel assembly.

FIG. 1 illustrates a fuel handling tool incorporating a redundant support system as provided by this invention. A long handled tool 10 is suspended from a bridge-like structure 11 by a cable 12 or other suitable means. One end of the cable 12 is wound around the drum of a motorized or power driven hoist 13, which when actuated, serves to raise or lower the long handled tool 10. As shown in FIG. 3, the lower end of the long handled tool 10 includes a pair of hooks 14 which are designed to fit within openings in the upper nozzle 15 of fuel assembly 16. Hooks 14 are pivotally connected to the lower end of the long handled tool 10 as shown in FIG. 3. Hooks 14 may be actuated by appropriate means (not shown) associated with long handled tool 10 such that fuel assembly 16 may be engaged or released. In FIG. 3, hooks 14 are shown in the engaged position with respect to fuel assembly 16.

Referring again to FIG. 1, it is seen that the power driven hoist 13 is mounted to the bridge 11 by rollers 17 which permit horizontal motion of long handled tool 10 in two opposite directions. Bridge 11, which in the example shown, comprises a spent fuel bridge employed in the spent fuel facilities of a commercial nuclear power plant, is mounted to a fixed structure 18 comprising, for example, a spent fuel pit. The bridge 11 is mounted on rollers 19 which permit movement of the long handled tool 10 in a second horizontal direction at a right angle to the first horizontal direction. The horizontal movement permitted by rollers 19 and rollers 17 when combined operate to permit movement of long handled tool 10 in any horizontal direction.

Figure 2:
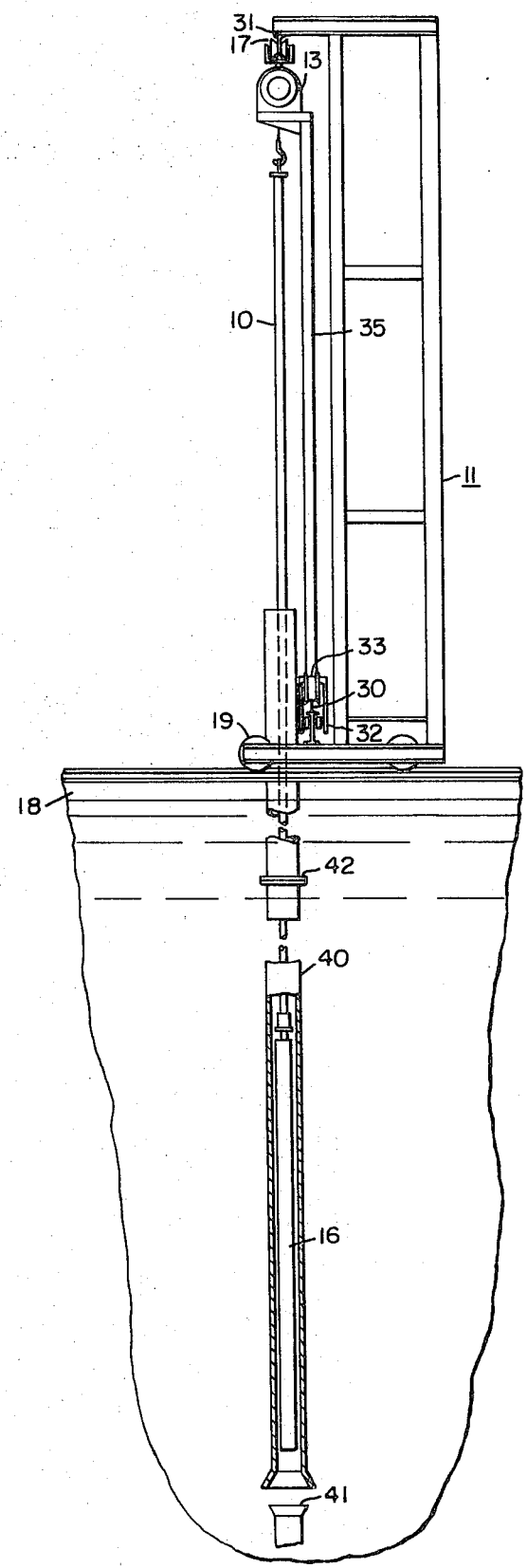
FIG. 2 is a side elevational view of the fuel handling tool of FIG. 1.

The apparatus thus far described is well known in the art and allows for transfer, under water, of a spent fuel assembly from one location to another. However, should failure of the cable 12 or the long handled tool 10 occur while a fuel assembly 16 is fully lifted, fuel assembly 16 will fall with high velocity and impact on the floor below, which could result in fuel cladding breaching and the subsequent release of dangerous radioactive fission gases. Such an occurrence is precluded from happening by the method and apparatus for handling irradiated fuel assemblies provided by this invention. A redundant support system is used in conjunction with a standard fuel handling tool, as shown in FIGS. 1 and 2. For purposes of description, the redundant support system may be considered to comprise three main structures: an upper structure for allowing the redundant support system to be moved laterally simultaneously with a suspended fuel assembly, a lower structure for redundantly engaging a spent fuel assembly, and an intermediate structural member for connecting the upper and lower structures. Other functions of the portions of the redundant support system will be apparent from the following description.

The upper structural portion includes a track 30 which is mounted to the spent fuel bridge 11. Track 30 extends the length of an overhead monorail 31 and is parallel to it. A trolley 32 including rollers 33 connected thereto is mounted to track 30 for lateral or horizontal movement thereon. Trolley 32 is fixedly connected to a bracket 34 to which the motorized hoist 13 is connected by structural members 35 comprising, for example, I-beams or angle irons. With this arrangement, horizontal movement of hoist 13 along rail 31 automatically and simultaneously results in similar horizontal movement of trolley 32.

A tubular or pipe member 40 extends from trolley 32 to, in the example shown, within approximately one foot of a fuel storage fixture 41. In a typical commercial nuclear power plant, the fuel assembly storage fixture 41 might comprise a spent fuel rack, a fuel assembly container of an upending device, or a shipping cask. Tube member 40 is fabricated in two sections, an upper cylindrical section and a lower section having a square configuration. These two sections are conventionally joined at flange members 42 by bolting or the like. The square configuration of the lower section of tube member 40 allows for insertion therein of a fuel assembly having a similarly square configuration. The long handled tube 10 is associated with the tube member 40 such that the former moves telescopically within the latter.

A fuel assembly latching mechanism, a latch carrier assembly and dashpots of the redundant support system are associated with the lower portion of tube member 40 as shown in FIGS. 1 through 9. FIGS. 1 and 2 show a general arrangement of this apparatus in cooperation with the overall spent or irradiated fuel assembly handling system. The details of this apparatus are shown in the remaining figures. Referring now to FIG. 3, the latch mechanism comprises a pair of hook-shaped members 50 mounted at one end for pivotal movement with latch carrier assembly 51. The other end of hook-shaped members 50 is connected by a spring 52 to the latch carrier assembly 51. Springs 52 serve to keep hook-shaped members 50 disengaged from the fuel assembly 16.

Figure 5:
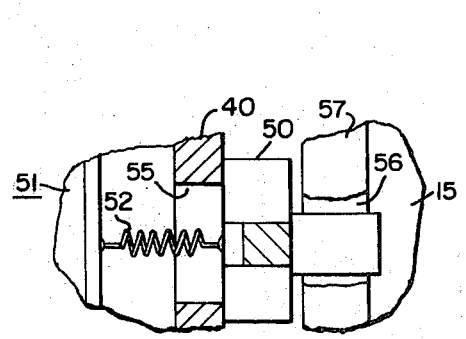
FIG. 5 is a cross-sectional view taken along the line V—V of FIG. 4.
Figure 4:
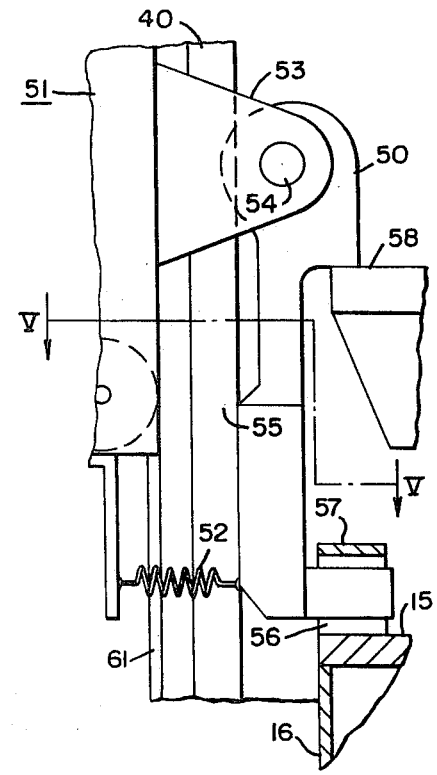
FIG. 4 is a still further enlarged view of the engagement of a fuel assembly by the redundant support mechanism as provided by this invention.

FIGS. 4 and 5 show in detail the manner by which the latches 50 redundantly engage fuel assembly 16. Referring now to these figures, it is seen that the latch 50 is connected to a bracket 53 by a pin 54, which allows the latch 50 to rotate about the centerline of pin 54. Bracket 53 is fixedly connected to a wall of the latch carrier assembly 51, such as by welding. A slot 55 is provided in the wall of tube member 40 for passage therethrough of bracket 53. The slot 55 permits the latch carrier assembly 51 and the pair of latches 50, when engaged with fuel assembly 16, to move axially along with fuel assembly 16 when the assembly is being lifted. In the embodiment shown, the engaging end of latch 50 fits within a space 56 formed by a fuel assembly spring 57 mounted to the top nozzle 15 of fuel assembly 16. The pair of latches 50 automatically engage with fuel assembly 16 by operation of the fuel handling tool 10. After grasping the fuel assembly 16, the motorized hoist 13 (FIG. 1) vertically lifts fuel handling tool 10 and thereby fuel assembly 16 from the storage facility 41. When the fuel assembly is raised approximately one foot, it enters the lower end of tube member 40 which is provided with a funnel shape to facilitate entry. Additional lifting causes a plate-shaped member 58 which is attached to long handled tool 10 to contact a ledge 59 which is integral with the pivotal end of latch 50. This in turn causes latch 50 to rotate about pin 54 and thereby engage fuel assembly 16 within the space provided by fuel assembly spring 57. At this time, springs 52 are extended and are applying force to rotate latch 50 back into the disengaged position, but this is prevented because of the width relationship of slot 55 and latch 50 as shown in FIG. 5.

Figure 8:
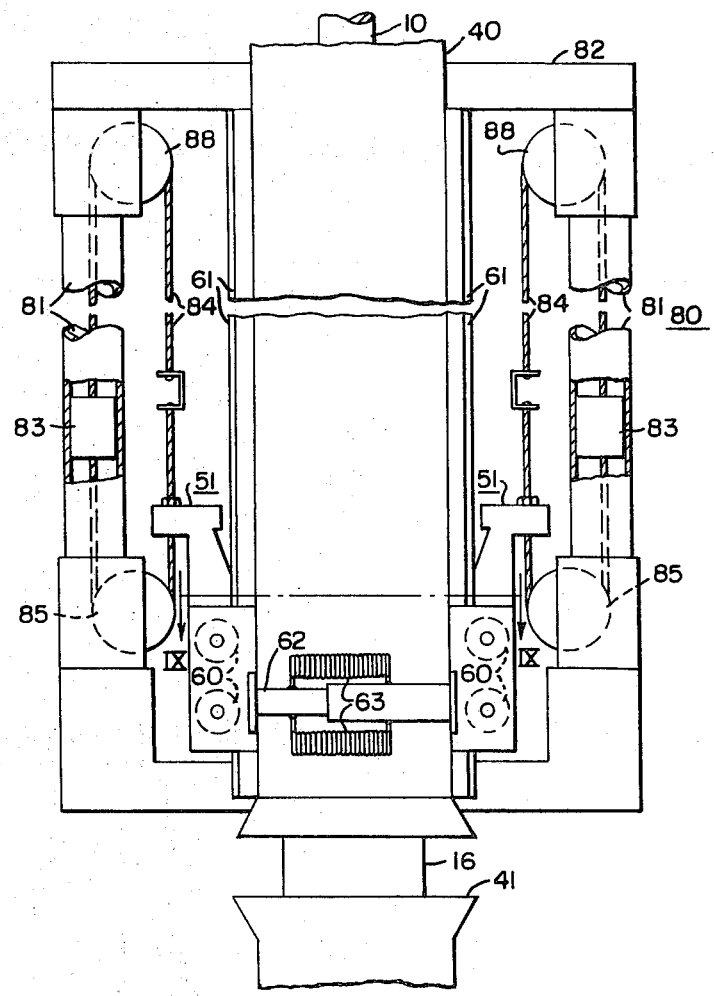
FIG. 8 is an elevational cross-sectional view showing a method of connecting the dashpot and latching mechanism.
Figure 9:
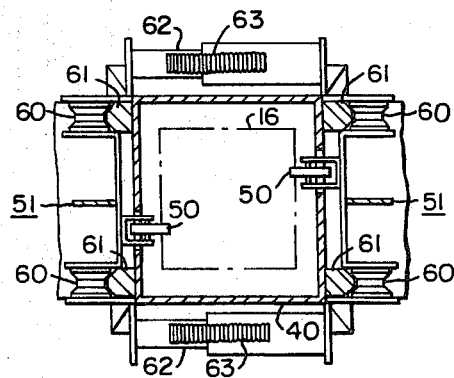
FIG. 9 is a cross-sectional view taken along the line IX—IX of FIG. 8.

The latch carrier assembly is most clearly shown in FIGS. 8 and 9. Referring now to these figures, it is seen that the latch carrier assembly 51 essentially comprises a square frame having wheels 60 which ride on tracks 61 which are fixedly attached to tube member 40. In these figures, the fuel assembly 16 is represented by dashed and dotted lines. Telescoping members 62 which comprise part of the frame of the latch carrier assembly 51 allow for assembly and self-centering of the latch carrier assembly 51 with respect to an engaged fuel assembly 16. Springs 63 respectively attached to each of the telescoping members 62 protect against "derailing" of the latch carrier assembly from the tracks 61 associated with tubular member 40.

Figure 6:
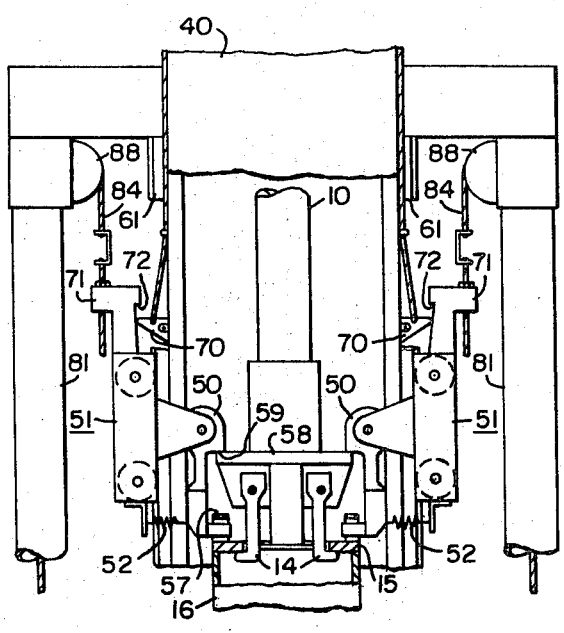
FIG. 6 is a detailed view of a portion of the fuel handling tool showing a method of locking in place a raised fuel assembly for horizontal transfer.

FIG. 6 shows a portion of the fuel handling tool 10 and the redundant support mechanism having a fuel assembly 16 raised to an uppermost position at which time, the fuel assembly 16 is ready for horizontal transfer. As can be seen, the fuel assembly 16 is firmly engaged by both the grasping members 14 of the fuel handling tool 10 and the pair of latches 50 of the redundant support system. On reaching a fully lifted position within tube member 40, an extension 71 integrally connected with the latch carrier assembly 51 momentarily pushes up the safety latch block 70 which rotates around a supporting pin and is returned to a downward position as shown in FIG. 6. The fully raised fuel assembly 16 is thus locked in this position by the combination of the safety latch blocks 70 and a projecting ledge 72 on extension 71. Thus, if a portion of the fuel handling tool 10 fails during lateral movement or transfer of the fuel assembly 16, the fuel assembly 16 is still precluded from being damaged by a falling accident.

Figure 7:
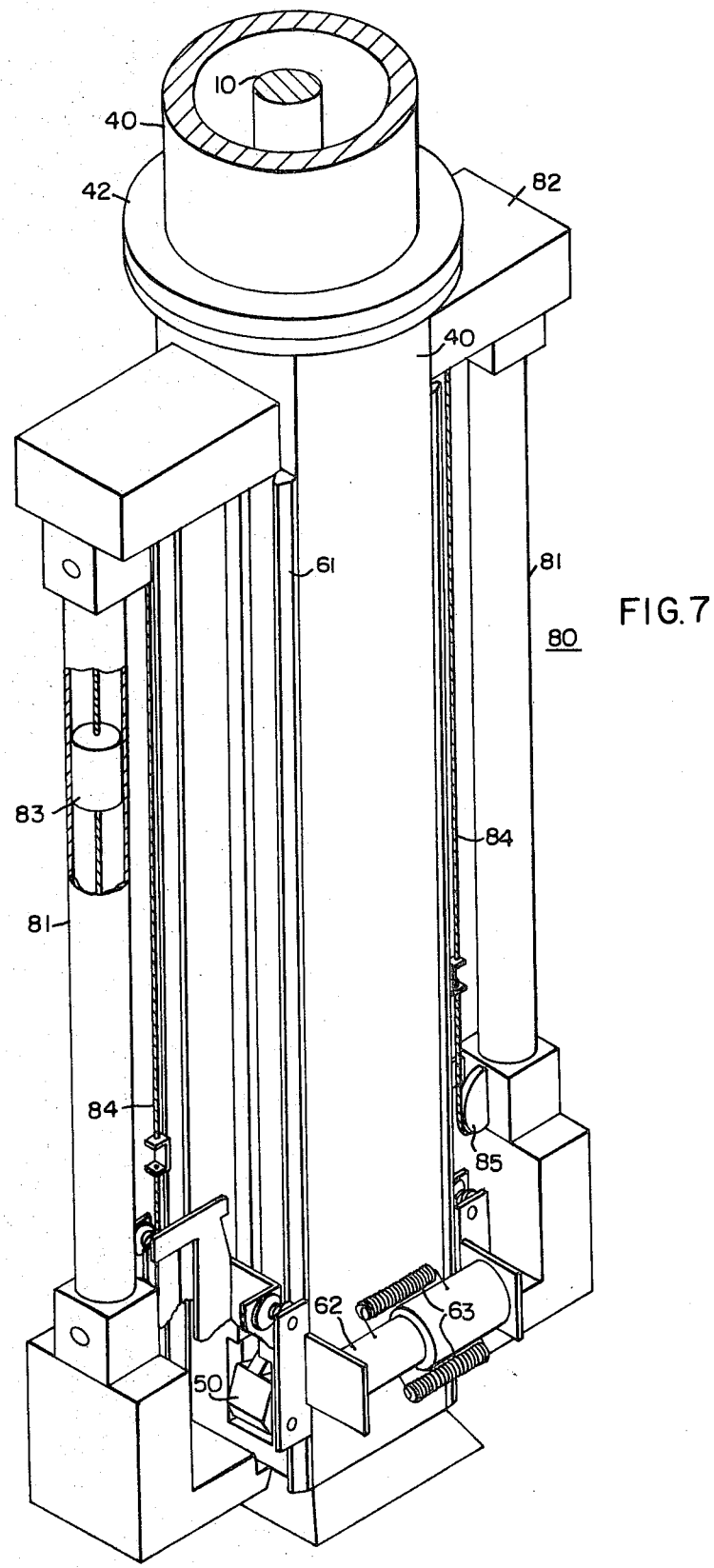
FIG. 7 is an isometric view of the bottom of the fuel handling tool showing the latched mechanism in cooperation with a dashpot.

A dashpot mechanism, such as that depicted in elevation in FIG. 8 and isometrically in FIG. 7, comprises the final portion of the redundant support system. The dashpot mechanism 80 functions to slowly lower an accidentally dropped irradiated fuel assembly while directly over a storage facility 41 (FIG. 1). As explained above, because of the safety latch blocks 70, it is impossible for an irradiated fuel assembly to be accidentally dropped while being handled in a location other than directly over a storage facility. The envisioned dashpot mechanism comprises a cable-cylinder as is well known in the art. A pair of cable-cylinder assemblies 80, having a cylinder 81 with a stroke equal to the length that an irradiated fuel assembly 16 to be raised, is fixedly connected at each end to tube member 40 such as by being bolted to supports 82 which are welded to tube member 40. Each of cylinders 81 is filled with a hydraulic fluid and contains a double-acting piston 83. An endless cable 84 is attached to both ends of piston 83, it then runs over rollers 85 and 88 respectively at the lower and upper ends of cylinder 81 and is attached to an extension of latch carrier 51. Although not shown, a needle valve and a bypass check valve are located at an upper port in cylinder 81 to maintain a safe downward rate of speed for the irradiated fuel assembly should the fuel handling tool 10 fail. A hydraulic fluid, such as water from a spent fuel pit, is drawn in or discharged through one of the ports (not shown) at either end of the cylinder, depending upon which axial direction the irradiated fuel assembly is being moved.

It is therefore apparent that there has been disclosed a method and apparatus for handling irradiated fuel assemblies of a nuclear reactor during transfer operations. The handling tool is positioned directly above an irradiated fuel assembly which is being supported in a vertical position in water. A power driven hoist lowers a tool which grasps the upper end of the irradiated fuel assembly. The irradiated fuel assembly is raised a short distance whereupon it enters a tubular member. A plate member attached to the tool trips a pair of latches which also engage the irradiated fuel assembly. Lifting of the fuel assembly continues until it is sufficiently clear of its vertically supporting fixture, at which time a pair of safety latch blocks rotate locking the fuel assembly in the fully raised position. The redundantly supported and locked in position irradiated fuel assembly is then transferred in a horizontal direction to a position directly above its destination point. The pair of safety latch blocks are then rotated, allowing the still redundantly supported irradiated fuel assembly to be lowered by the hoist mechanism. Upon reaching a lowered position, which is a relatively short vertical distance from a fully lowered position, the redundant grasping latches are automatically released, whereupon the fuel assembly is still supported by the lifting tool. Upon reaching a fully lowered position, the lifting tool is disengaged from the irradiated fuel assembly, thereby completing the transfer operation. Should the irradiated fuel assembly have become disengaged from the lifting tool during the raising or lowering operations, the irradiated fuel assembly is prevented from falling freely by the redundant support apparatus. Dashpot apparatus associated with the redundant support system allows the irradiated fuel assembly to be lowered at a controlled, slow rate of speed, thereby negating the possibility of damaging the irradiated fuel assembly.

Since numerous changes may be made in the above-described apparatus, and different embodiments of the invention may be made without departing from the spirit and scope thereof, it is intended that all the matter contained in the foregoing description or shown in the accompanying drawings shall be interpreted as illustrative and not in a limiting sense.

We claim:

1. Apparatus for handling irradiated fuel assemblies of a nuclear reactor during underwater transfer operations, said apparatus comprising means for lifting and lowering a fuel assembly, means for moving the fuel assembly in a horizontal direction, first support means for structurally supporting the fuel assembly during the handling operations, said first support means including apparatus for grasping the fuel assembly, and second support means for redundantly supporting the fuel assembly, said second support means including apparatus for redundantly grasping the fuel assembly, said redundant grasping apparatus being activated so as to engage the fuel assembly by lifting of the fuel assembly with said lifting means.

2. The apparatus of claim 1 including dashpot means interposed between said redundant support and said redundant gasping apparatus for preventing rapid lowering of the fuel assembly from a raised position.

3. The apparatus of claim 1 including latching means for fixedly coupling a raised fuel assembly to said second support means, said latching means being activated by the fuel assembly when the fuel assembly is lifted to a predetermined height.

4. Apparatus for handling irradiated fuel assemblies of a nuclear reactor during underwater transfer operations, said apparatus comprising:

a bridge-like structure positioned over a container having at least one irradiated fuel assembly positioned therein, said bridge-like structure being mounted for movement on track apparatus, fuel assembly handling means for grasping, vertically lifting, vertically lowering and releasing said irradiated fuel assembly, said fuel handling means being movably mounted to said bridge-like structure for axial and horizontal movement thereon, trolley means mounted to said bridge-like structure for travel thereon in a horizontal direction, an elongated rod member fixedly connected at one end to said trolley means, said rod member extending in a generally vertical direction and having its other end terminate at a location proximate an end of said irradiated fuel assembly, and latching means for providing redundant grasping of said irradiated fuel assembly during handling of said irradiated fuel assembly, said latching means being movably connected to said rod member for axial movement thereon.

5. The apparatus of claim 4 including latch blocks pivotally connected to said rod member for locking said irradiated fuel assembly in a raised position for horizontal transfer of said irradiated fuel assembly.

6. The apparatus of claim 4, wherein said rod member comprises a tube with said fuel handling means passing through the interior thereof.

7. The apparatus of claim 4 including dashpot means for preventing rapid lowering of said irradiated fuel assembly from a raised position, said dashpot means being fixedly connected to said rod member and movably attached to said latching means.

8. The apparatus of claim 7 wherein said dashpot means comprises at least one elongated tube member serving as a cylinder for travel therein of a piston, said piston being connected by an endless cable to said latching means, said dashpot means being operated by a hydraulic fluid contained within said cylinder and acting on both sides of said piston.

9. A method for handling an irradiated fuel assembly of a nuclear reactor during underwater transfer operations comprising the steps of grasping the fuel assembly by support apparatus, initiating lifting of the fuel assembly, tripping redundant grasping and support apparatus so that the fuel assembly is redundantly grasped and supported thereby, then lifting the fuel assembly and the redundant support simultaneously.

10. The method of claim 9 including the additional step of activating a dashpot while the fuel assembly is being lifted and supported by both the support and the redundant support.

11. The method of claim 9 including the additional step of fixedly coupling the fuel assembly to the redundant support when the fuel assembly is fully raised with respect to the supporting apparatus.

12. The method of claim 11 including the step of lowering the fuel assembly at a predetermined rate of descent which is controlled by the dashpot.

13. The method of claim 12 including the additional step of disengaging the fuel assembly from the redundant support by lowering the fuel assembly, then ungrasping the fuel assembly from the support when the fuel assembly is fully lowered.

* * * * *